United States Patent
Lin

(10) Patent No.: US 11,415,247 B2
(45) Date of Patent: Aug. 16, 2022

(54) IN-TUBE FIXING ASSEMBLY

(71) Applicant: Chien-Ting Lin, Santa Fe Springs, CA (US)

(72) Inventor: Chien-Ting Lin, Santa Fe Springs, CA (US)

(*) Notice: Subject to any disclaimer, the term of this patent is extended or adjusted under 35 U.S.C. 154(b) by 86 days.

(21) Appl. No.: 16/184,687

(22) Filed: Nov. 8, 2018

(65) Prior Publication Data
US 2019/0145555 A1 May 16, 2019

(30) Foreign Application Priority Data

Nov. 10, 2017 (CN) .......................... 201721492391.9

(51) Int. Cl.
| | |
|---|---|
| *F16L 15/00* | (2006.01) |
| *F16B 17/00* | (2006.01) |
| *F16B 9/00* | (2006.01) |
| *F16L 13/14* | (2006.01) |
| *F16L 55/11* | (2006.01) |
| *F16B 7/10* | (2006.01) |

(52) U.S. Cl.
CPC ............ *F16L 15/005* (2013.01); *F16B 9/058* (2018.08); *F16B 17/004* (2013.01); *F16L 13/14* (2013.01); *F16B 7/10* (2013.01); *F16L 55/1108* (2013.01)

(58) Field of Classification Search
CPC ..... F16L 15/005; F16L 13/14; F16L 55/1108; F16B 17/004; F16B 7/10; F16B 9/05; F16B 9/056; F16B 9/058
USPC .................................................. 403/306, 308
See application file for complete search history.

(56) References Cited

U.S. PATENT DOCUMENTS

| | | | | |
|---|---|---|---|---|
| 2,903,152 A * | 9/1959 | Chi-Sheng | ............... | F16J 13/12 220/328 |
| 3,159,302 A * | 12/1964 | Latham | .................... | F16J 15/48 220/233 |
| 3,451,585 A * | 6/1969 | Jorgensen | ................ | F16J 13/02 220/327 |
| RE27,011 E * | 12/1970 | Jorgensen | ................ | F16J 13/02 220/327 |
| 3,599,825 A * | 8/1971 | Jorgensen | ................ | F16J 12/00 220/327 |
| 3,612,339 A * | 10/1971 | Jorgensen | ................ | F16J 13/12 220/315 |
| 4,291,996 A * | 9/1981 | Gilb | ........................ | F16B 9/058 403/14 |
| 7,278,450 B1 * | 10/2007 | Condon | ............. | F16L 55/1108 138/89 |
| 7,607,456 B1 * | 10/2009 | Schulz | ................ | F16L 55/1141 138/89 |

(Continued)

*Primary Examiner* — James M Hewitt, II
(74) *Attorney, Agent, or Firm* — Lin & Associates Intellectual Property, Inc.

(57) ABSTRACT

An in-tube fixing assembly includes a primary tube having an inner space and an inner wall; a fixing member inserted into the inner space from an opened end of the primary tube and provided with at least one through hole at an appropriate position; and at least one screw member, a diameter of the screw member gradually decreasing from the operation end to the insertion end, wherein the screw member is inserted into the through hole in a direction from the opened end to the inner space of the primary tube, the insertion end of the screw member abuts against the inner wall of the primary tube to form a small recess thereon that are complementary to a shape of the screw member.

3 Claims, 18 Drawing Sheets

(56) References Cited

U.S. PATENT DOCUMENTS

2008/0309074 A1* 12/2008 Olano Jauregui ...... F16B 12/42
  285/255
2018/0128298 A1*  5/2018 Lin ........................ F16M 11/28

* cited by examiner ent of the present invention;

IN-TUBE FIXING ASSEMBLY

CROSS-REFERENCE TO RELATED APPLICATION

This application claims the priority of Chinese patent application No. 201721492391.9, filed on Nov. 10, 2017, which is incorporated herewith by reference.

BACKGROUND OF THE INVENTION

1. Field of the Invention

The present invention generally relates to a tube fixing assembly, and more particular to an in-tube fixing assembly for fixing an object inside or at an end of a tube.

2. The Prior Arts

In general, there are at least two types of tube fixing assembly for fixing an object, such as a tube sleeve or a tube plug, inside or at an end of a tube to prevent the object from falling off. One is an in-tube fixing assembly and the other is a tube external-fixation assembly.

A conventional tube external-fixation assembly accomplishes a fixation by: first, inserting an object inside or at an end of a tube, and then penetrating a screw through a wall of the tube and the object from outside the tube. A disadvantage of such a fixation manner is that a head of the screw protrudes outside the tube. If an outer tube is to be sleeved on an exterior of the tube, the head of the screw will hinder the tube from being smoothly sleeved into the outer tube. As such, in order to smoothly sleeve the outer tube on the exterior of the tube, it is often needed to increase a diameter of the outer tube or to pre-form with a recess on the tube at a position where the head of the screw is inserted. However, both solutions will definitely affect the volume of the product, thereby resulting in an increase in the material cost, the manufacturing cost, the delivery cost, and thus an unnecessary waste.

A conventional in-tube fixing assembly generally accomplishes a fixation by: disposing an auxiliary member having elasticity, such as a plum-shaped tube inner rout inside the tube at an appropriate position, and then fixing the object with the plum-shaped tube inner nut by a screw member. A disadvantage of such a fixation manner is that an additional auxiliary member is needed, thereby resulting in an increase in not only the material cost, but also the manufacturing cost.

SUMMARY OF THE INVENTION

In order to overcome the problem of the cost increase resulting from the increase in the volume of the product and additional auxiliary members of the conventional tube fixing assembly, the present invention provides an in-tube fixing assembly, in which a screw member is inserted into a tube from an opened end of the tube and is meanwhile inserted into an object or a fixing member that is fixed inside or at the end of the tube by the engagement of the screw member with an inner wall of the tube. Such a fixing structure, which provides a fixation from inside to outside of the tube, does not affect the volume of the product and also does not need additional auxiliary members. Moreover, it is simple in operation and low in manufacturing cost for such fixing structure to achieve the purpose of fixation.

To achieve the above-mentioned purpose, an in-tube fixing assembly according to the present invention comprises: a primary tube having an inner space and an inner wall defining the inner space; a fixing member inserted partially or wholly into the inner space from an opened end of the primary tube and provided with at least one through hole at an appropriate position, the through hole provided with an accommodation part extending in a direction from the through hole toward the inner wall of the primary tube by a predetermined angle; and at least one screw member, one end of which is defined as an operation end and the other end defined as an insertion end, a diameter of the screw member configured to gradually decrease from the operation end to the insertion end, wherein the screw member is inserted into the through hole in a direction from the opened end to the inner space of the primary tube, such that when the insertion end is rotatably inserted into the accommodation part from the through hole, the insertion end of the screw member abuts against the inner wall of the primary tube to form a small recess thereon, the small recess and the accommodation part respectively form a first engaging thread and a second engaging thread, that are complementary to a shape of the screw member.

A beneficial effect of the present invention is that such a fixing is accomplished by inserting the screw member into the inner space from the opened end and further by mutually engaging the screw member with the inner wall. When an external force parallel to the primary tube is applied on the fixing member, since the insertion end of the screw member and the small recess are tightly engaged by the first engaging thread formed thereon, the fixing member can prevent from being detached from the primary tube due to the external force. If the fixing member needs to be detached from the inside or the end of the primary tube, that can be done by simply rotating and pulling out the screw member.

BRIEF DESCRIPTION OF THE DRAWINGS

The present invention will be apparent to those skilled in the art by reading the following detailed description of embodiments, with reference to the attached drawings, in which.

DETAILED DESCRIPTION OF THE PREFERRED EMBODIMENTS

Figure 1:
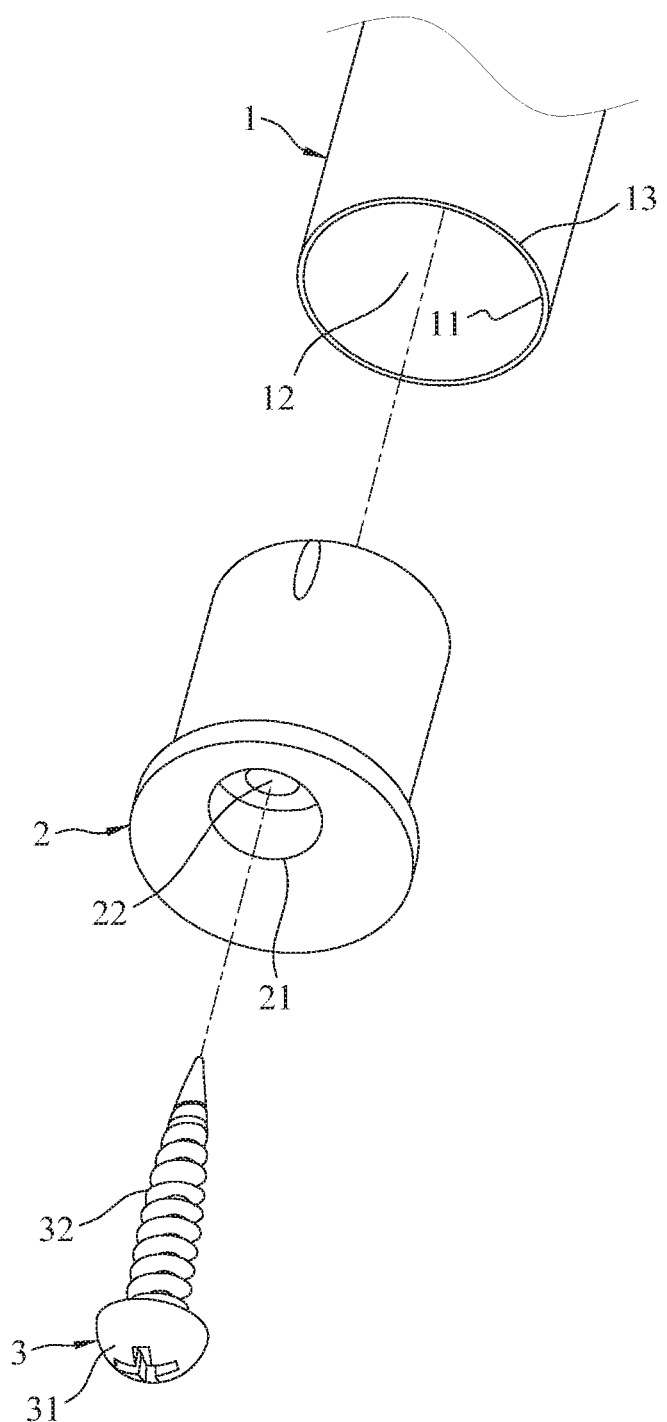
FIG. 1 is an exploded perspective view of a first embodiment of the present invention.

The embodiments of the present invention will be described with reference to the following attached FIG. 1 to FIG. 10B. The description herein serves to explain the embodiments of the present invention, but not to limit the present invention.

Referring to FIG. 1 to FIG. 4B, an in-tube fixing assembly according to the first embodiment of the present invention, for fixing an object in a tube or at an end of the tube, comprises a primary tube 1, a fixing member 2, and at least one screw member 3. The primary tube 1 has an inner wall 11 and an inner space 12, and the inner wall 11 surrounds and defines the inner space 12. The fixing member 2 is partially or wholly inserted into the inner space 12 from an opened end 13 of the primary tube 1. The fixing member 2 is provided with at least one through hole 21 at an appropriate position, and the through hole 21 is provided with an accommodation part 22 extending in a direction from the through hole 21 toward the inner wall 11 by a predetermined angle A with respect to the inner wall 11. One end of the screw member 3 is defined as an operation end 31 while the other end of the screw member 3 is defined as an insertion end 32. A diameter of the screw member 3 gradually decreases from the operation end 31 to the insertion end 32. At the time the screw member 3 is inserted into the through hole 21 in a direction from the opened end 13 to the inner space 12 of the primary tube 1, the insertion end 32 is rotatably inserted into the accommodation part 22 from the through hole 21, and the insertion end 32 of the screw member 3 presses and abuts against the inner wall 11 to form a small recess 111 thereon. A portion of the screw member 3 near the operation end 13 is kept inside the fixing member 2. The small recess 111 and the accommodation part 22 are respectively formed with a first engaging thread 112 and a second engaging thread 221, which are complementary to the screw thread of the screw member 3. In accordance with the present invention, such a fixation manner is accomplished by inserting the screw member 3 into the inner space 12 from the opened end 13 and further by mutually engaging the screw member 3 with the inner wall 11. When an external force parallel to the primary tube 1 is applied on the fixing member 2, since the insertion end 32 of the screw member 3 and the small recess 111 are tightly engaged by the first engaging thread 112 formed thereon, the fixing member 2 can prevent from being detached from the primary tube 1 due to the external force. If the fixing member 2 needs to be detached from the inside or the end of the primary tube 1, that can be done by simply rotating and pulling out the screw member 3.

Figure 2A:
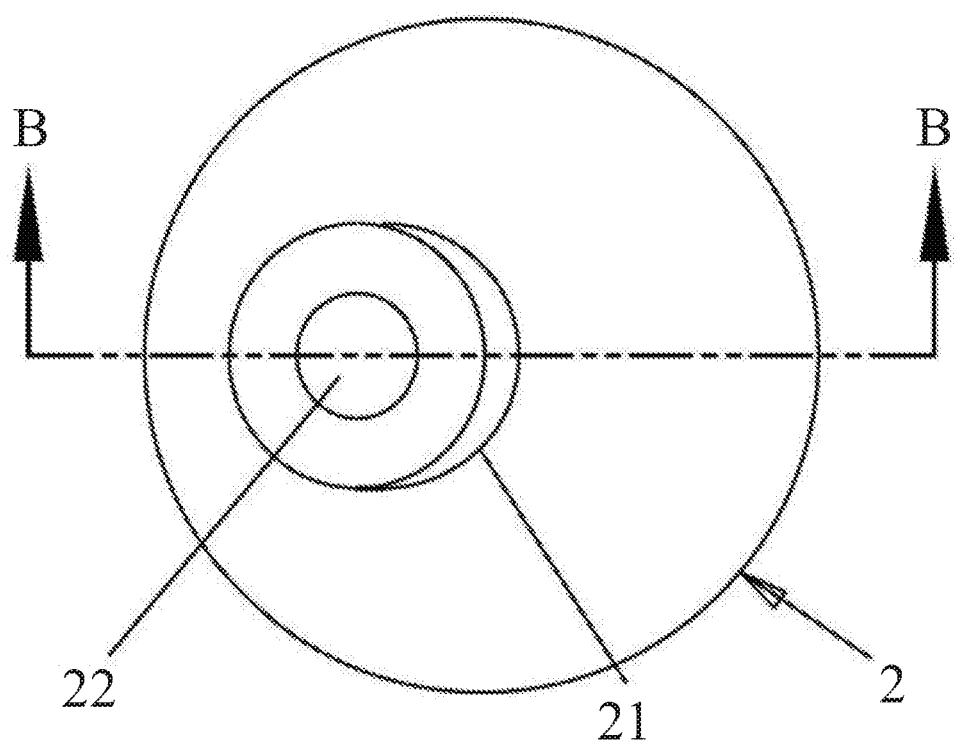
FIG. 2A is a bottom view of the first embodiment of the present invention before the screw member is inserted into the through hole and the accommodation part.
Figure 2B:
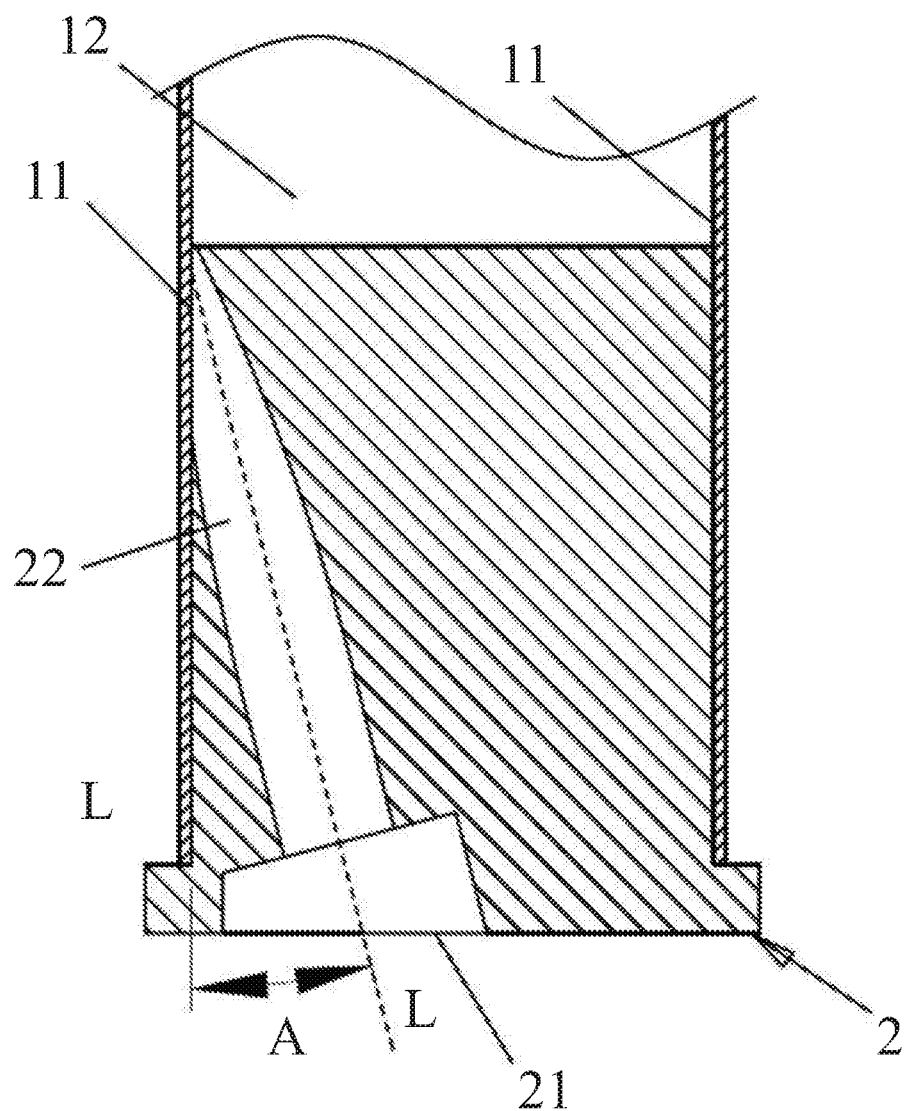
FIG. 2B is a partially cross-sectional view of the first embodiment of the present invention taken along line B-B before the screw member is inserted into the through hole and the accommodation part.
Figure 3A:
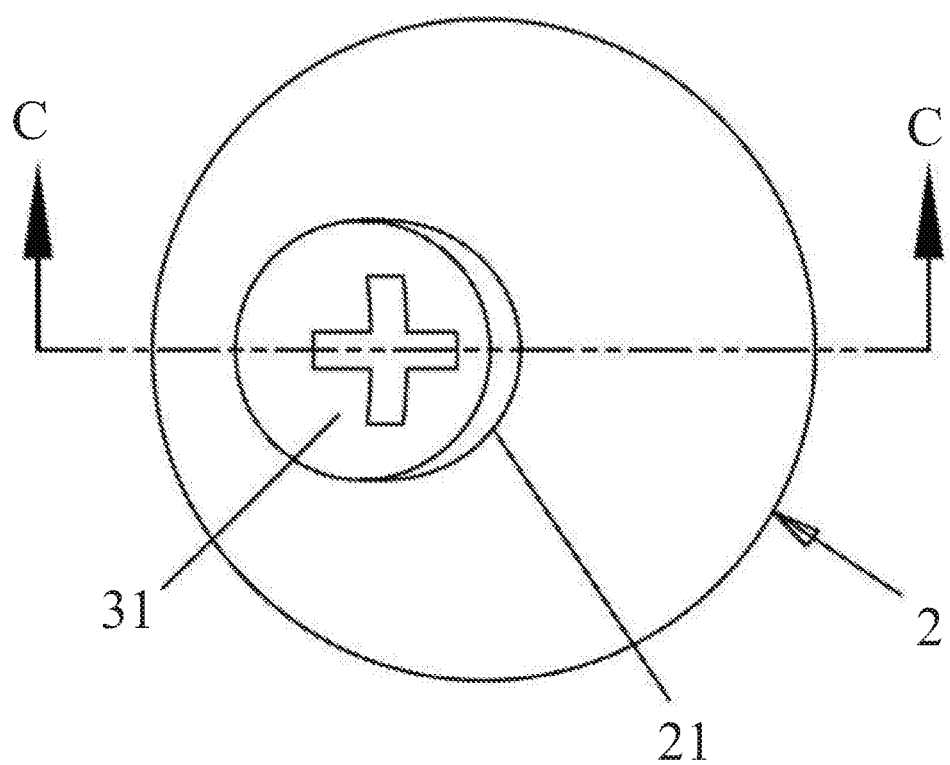
FIG. 3A is a bottom view of the first embodiment of the present invention, illustrating the screw member is inserted into the through hole and the accommodation part.
Figure 3B:
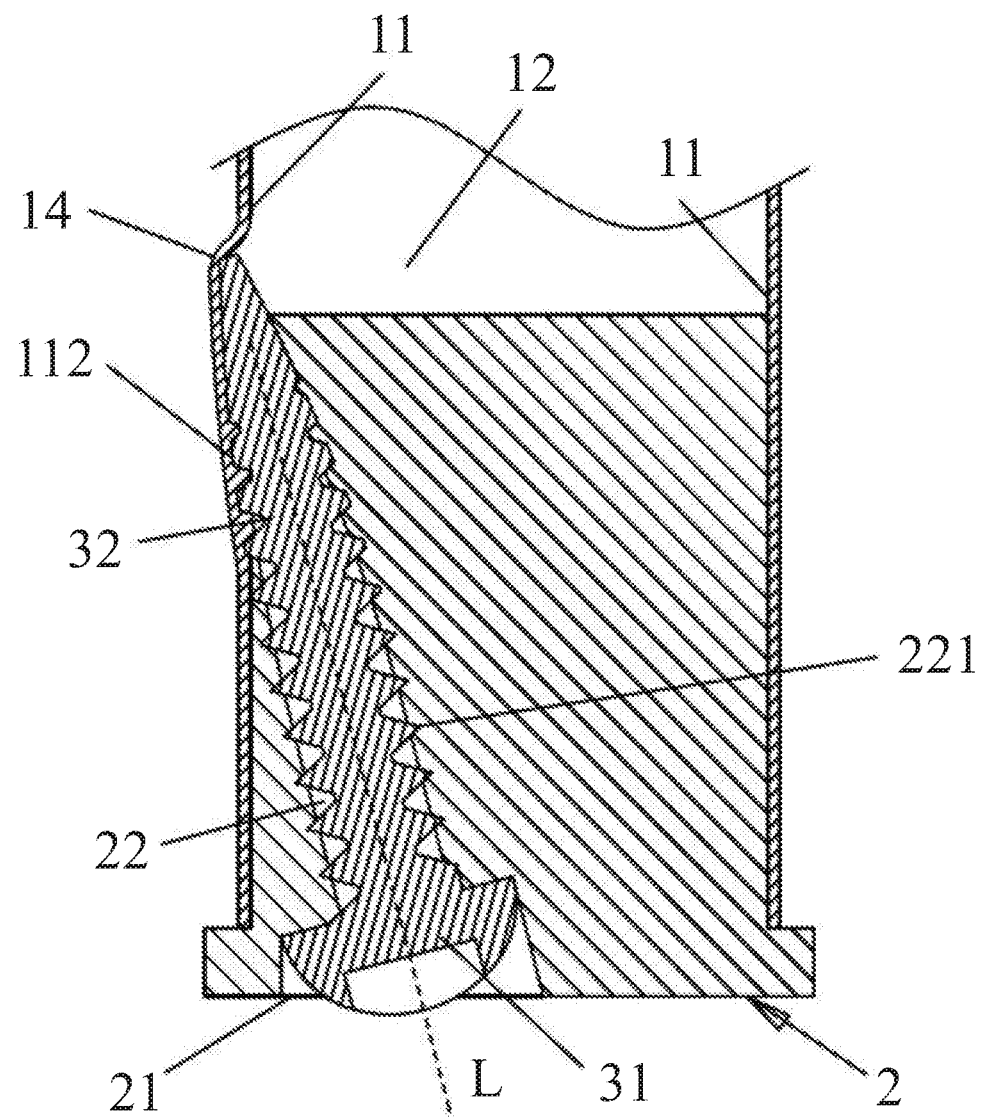
FIG. 3B is a partially cross-sectional view of the first embodiment of the present invention taken along line C-C, illustrating the screw member is inserted into the through hole and the accommodation part.
Figure 4A:
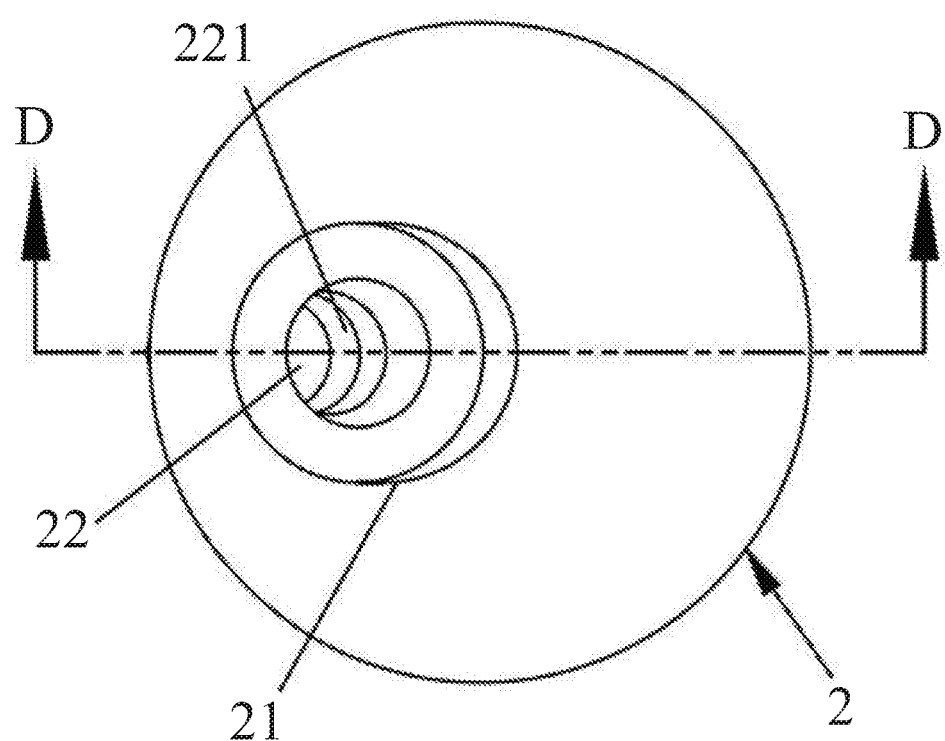
FIG. 4A is a bottom view of the first embodiment of the present invention after the screw member is pulled out from the through hole and the accommodation part.
Figure 4B:
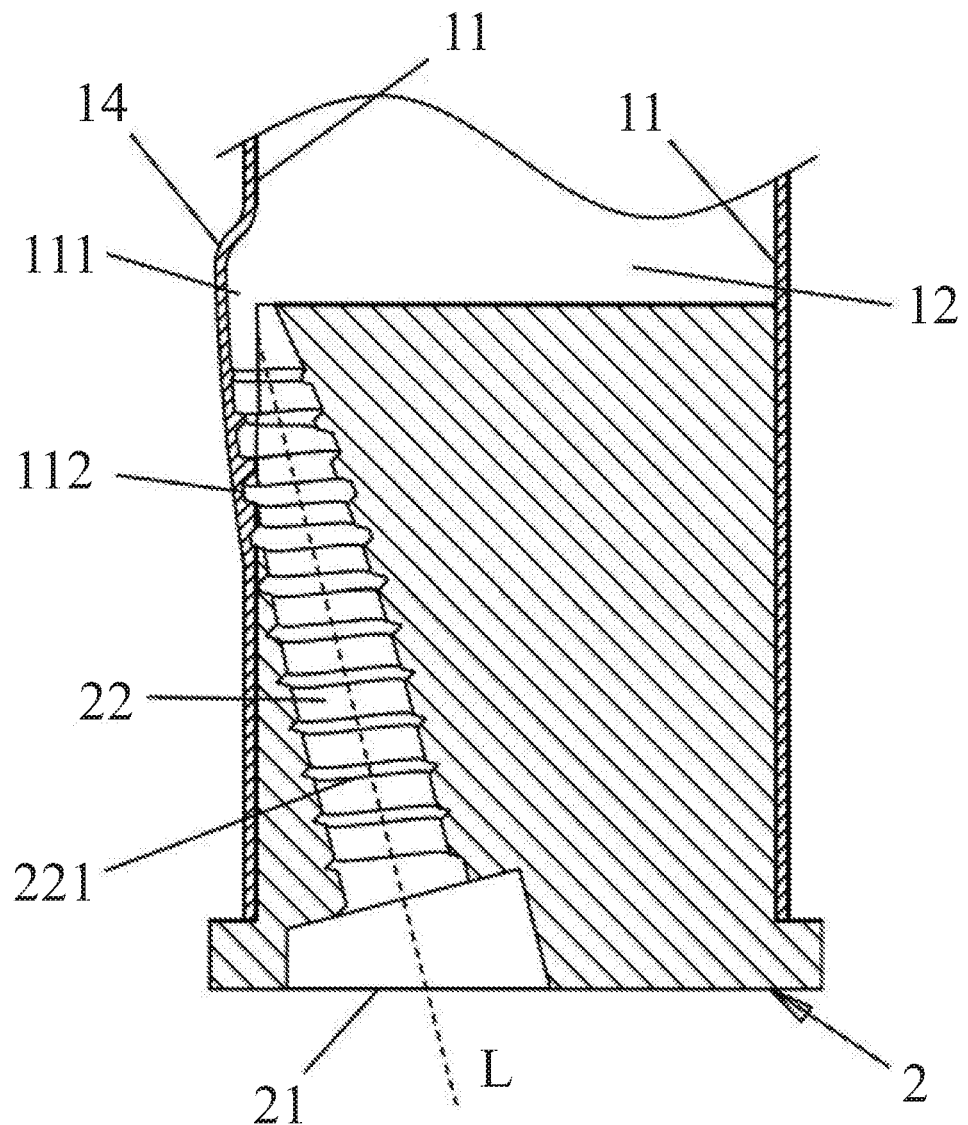
FIG. 4B is a partially cross-sectional view of the first embodiment of the present invention taken along line D-D after the screw member is pulled out from the through hole and the accommodation part.

FIG. 1 illustrates an exploded perspective view of the in-tube fixing assembly according to the first embodiment of the present invention. FIG. 2A and FIG. 2B illustrate illustrates that the fixing member 2 is partially inserted into the inner space 12, wherein FIG. 2A and FIG. 2B are a bottom view and a partially cross-sectional view taken along line B-B, respectively, before the screw member 3 is inserted into the through hole 21 and the accommodation part 22. A periphery of the accommodation part 22 is a smooth surface decreasing in a direction from the through hole 21 toward the inner wall 11 by a predetermined angle A with respect to the inner wall 11. The predetermined angle A is an acute angle included by an insertion axis L of the accommodation part 22 and the inner wall 11. FIG. 3A and FIG. 3B are a bottom view and a partially cross-sectional view taken along line C-C, respectively, illustrating that the screw member 3 is inserted into the through hole 21 and the accommodation part 22. When the insertion end 32 of the screw member 3 is rotatably inserted from the through hole 21 into the accommodation part 22 along the insertion axis L, the accommodation part 22 forms the second engaging thread 221 which is complementary to the shape of the screw member 3, and the insertion end 32 abuts against the inner wall 11 to form the small recess 111 thereon. The small recess 111 forms the first engaging thread 112 which is complementary to the shape of the screw member 3. When the first primary tube 1 has a thinner wall, a small protrusion 14 is formed on an outer wall of the primary tube 1 at a position corresponding to the small recess 111. FIG. 4A and FIG. 4B are a bottom view and a partially cross-sectional view taken along line D-D, respectively, after the screw member 3 is pulled out from the through hole 21 and the accommodation part 22. FIG. 4A and FIG. 4B show the second engaging thread 221 of the accommodation part 22 and the first engaging thread 112 of the small recess 111.

Figure 5:
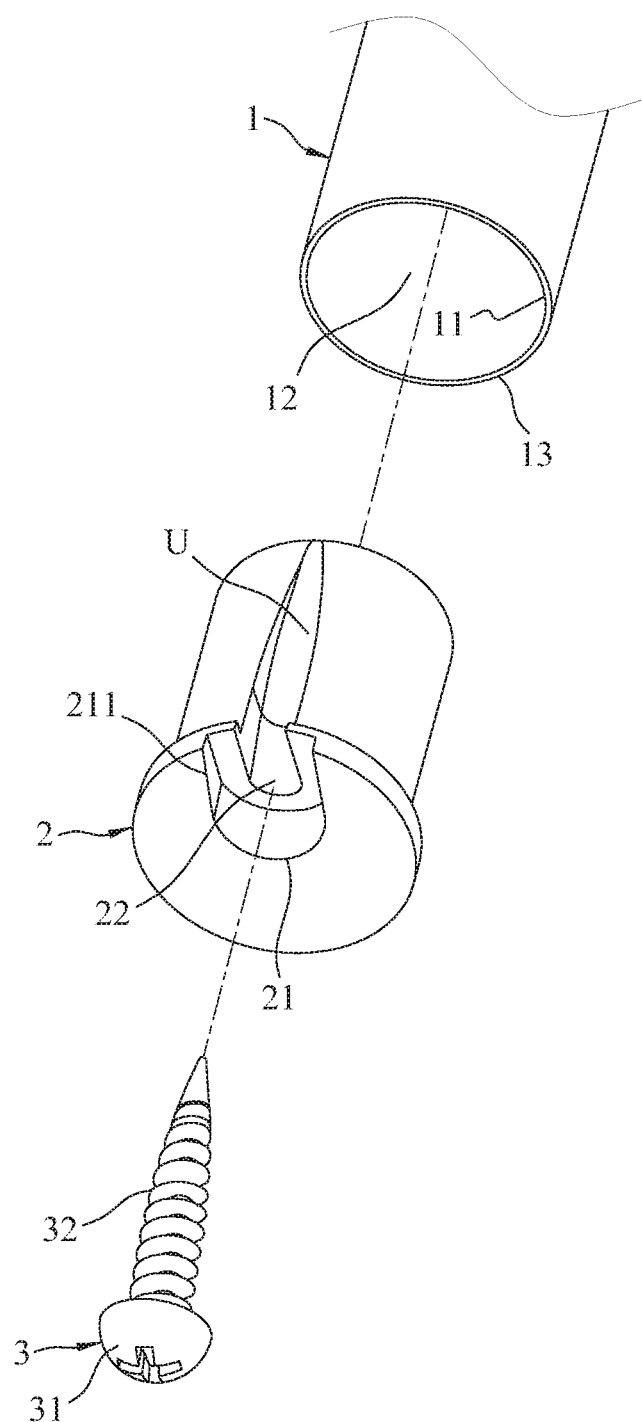
FIG. 5 is an exploded perspective view of a second embodiment of the present invention.
Figure 6A:
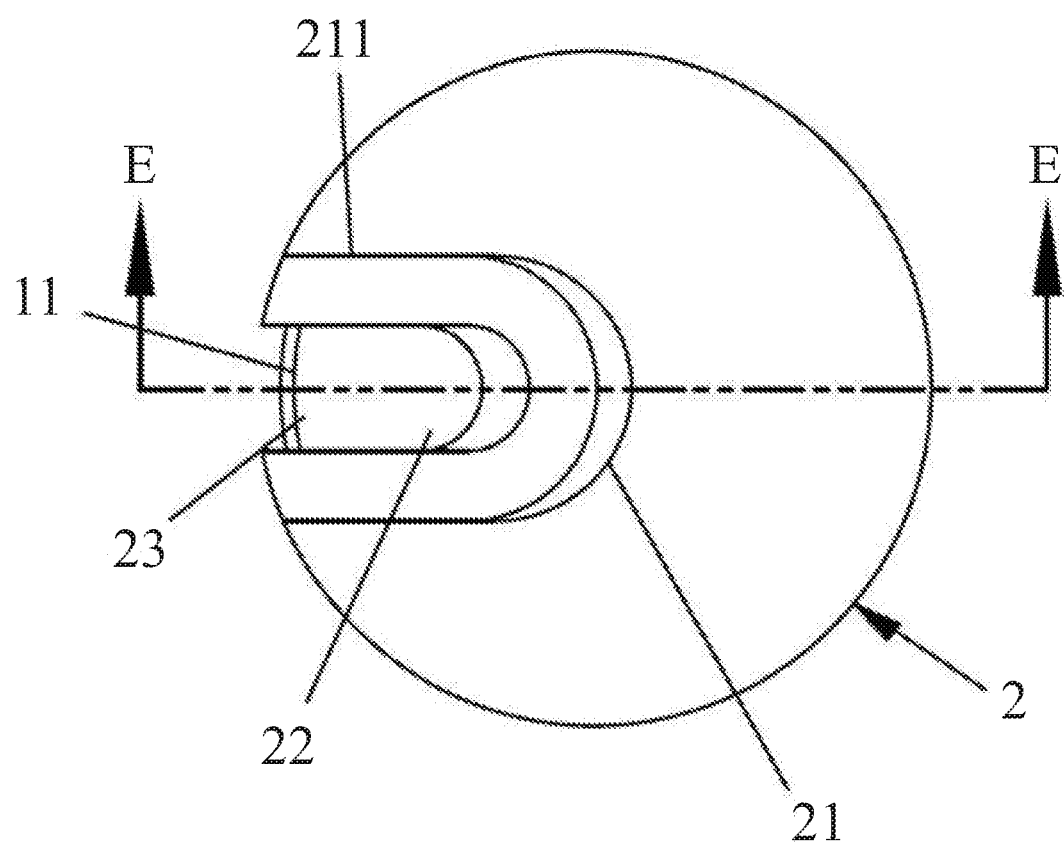
FIG. 6A is a bottom view of the second embodiment of the present invention before the screw member is inserted into the through hole and the accommodation part.
Figure 6B:
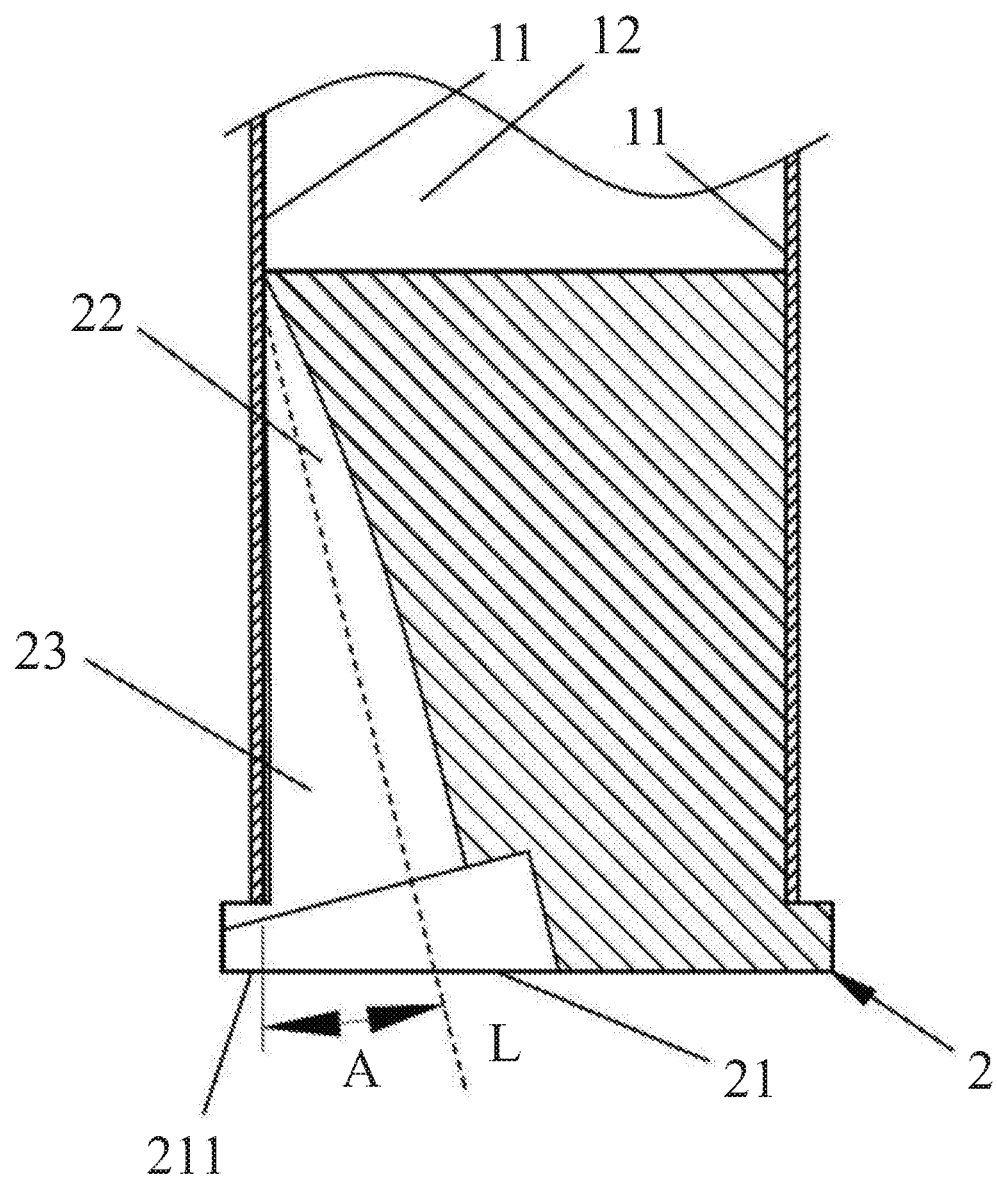
FIG. 6B is a partially cross-sectional view of the second embodiment of the present invention taken along line E-E before the screw member is inserted into the through hole and the accommodation part.
Figure 7A:
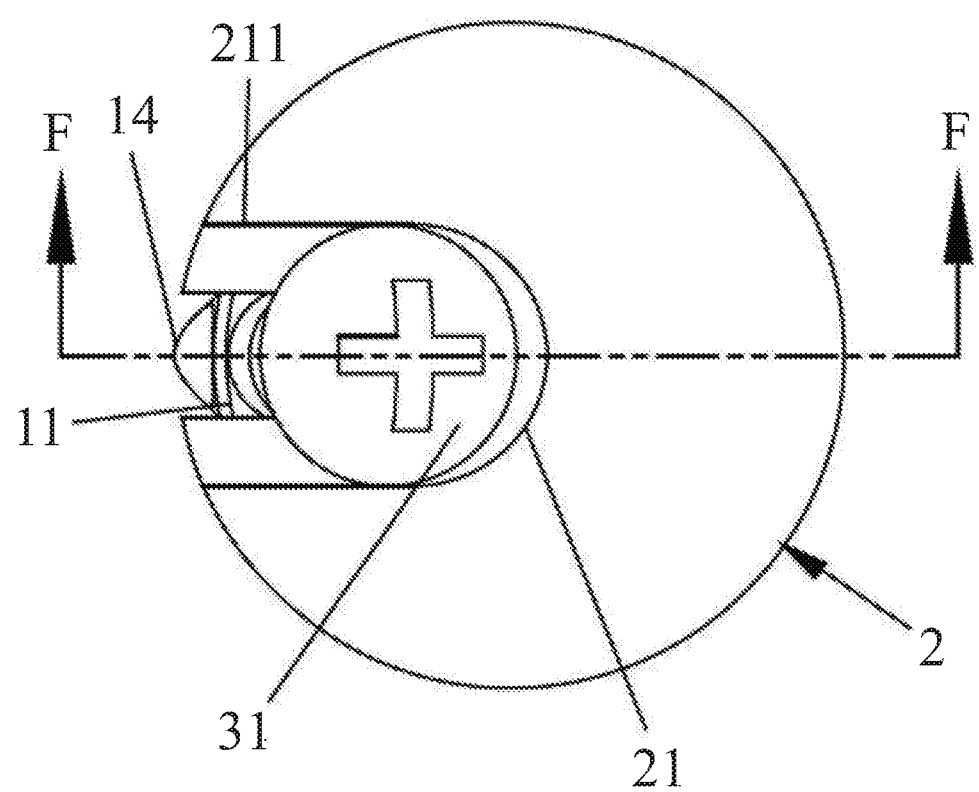
FIG. 7A is a bottom view of the second embodiment of the present invention, illustrating the screw member is inserted into the through hole and the accommodation part.
Figure 7B:
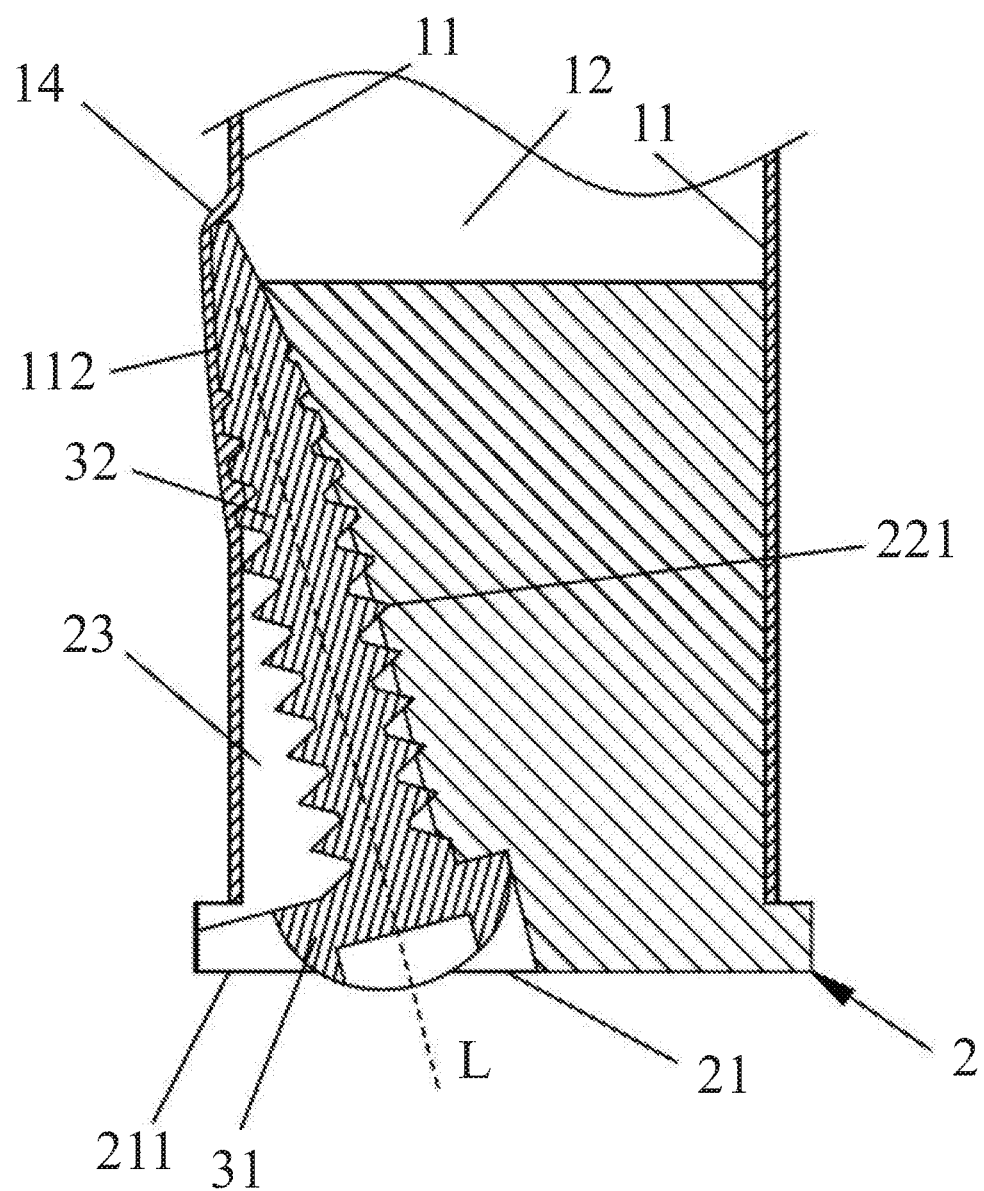
FIG. 7B is a partially cross-sectional view of the second embodiment of the present invention taken along line F-F, illustrating the screw member is inserted into the through hole and the accommodation part.
Figure 8A:
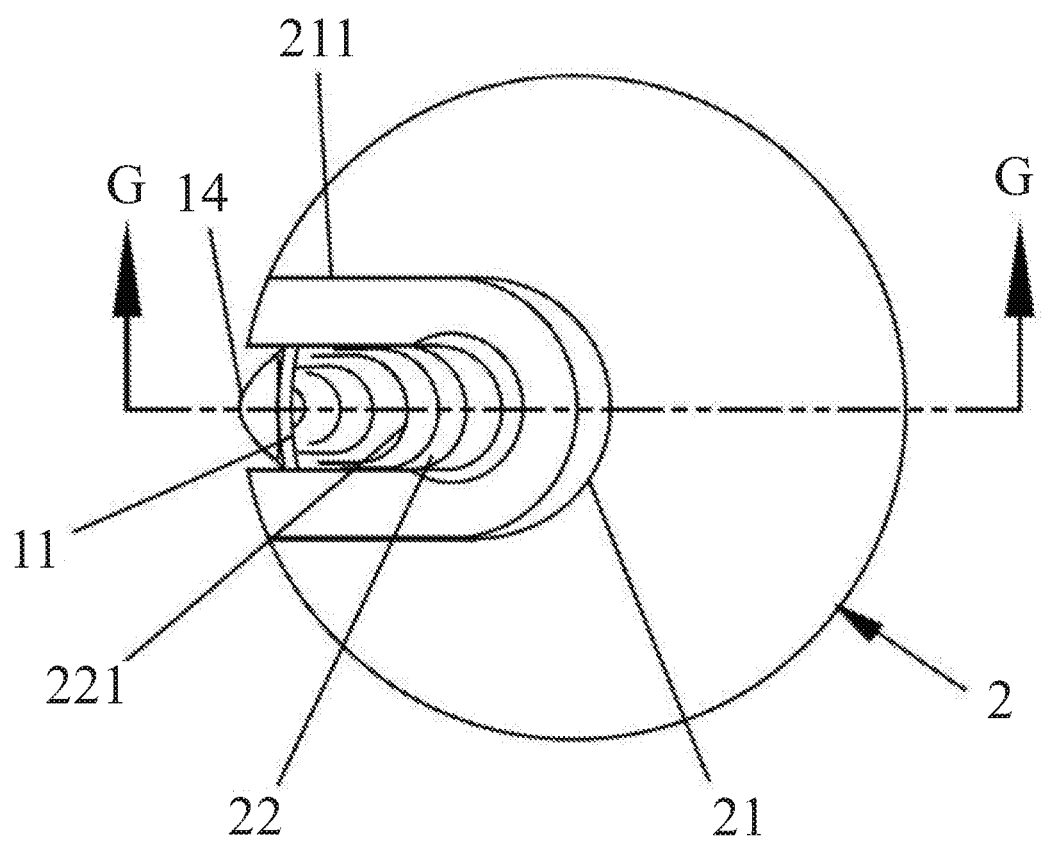
FIG. 8A is a bottom view of the second embodiment of the present invention after the screw member is pulled out from the through hole and the accommodation part.
Figure 8B:
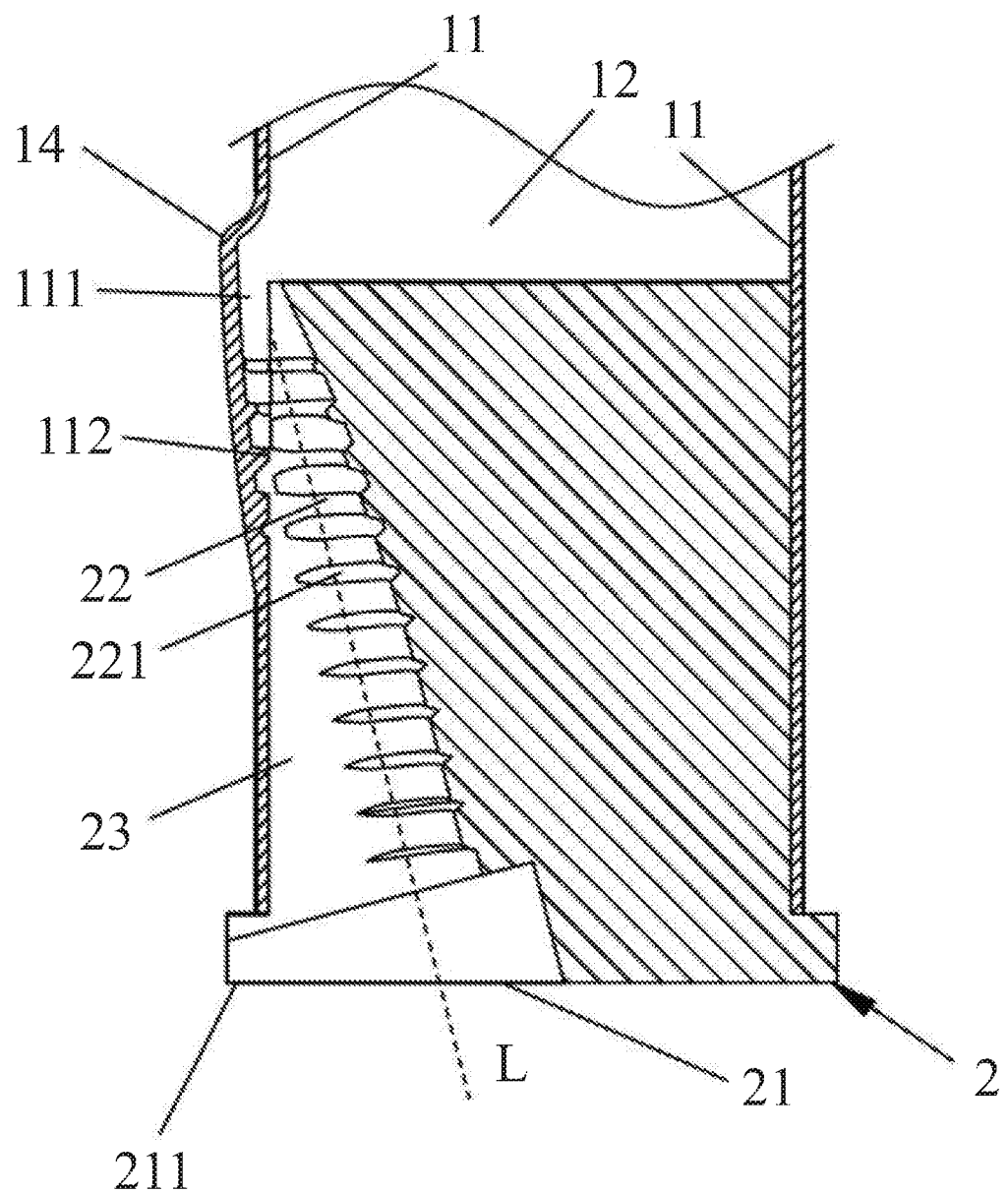
FIG. 8B is a partially cross-sectional view of the second embodiment of the present invention taken along line G-G after the screw member is pulled out from the through hole and the accommodation part.

FIG. 5 illustrates an exploded perspective view of the second embodiment of the present invention. As shown in FIG. 6A to FIG. 8B, the fixing member 2 is inserted into the inner space 12, wherein FIG. 6A and FIG. 6B are a bottom view and a partially cross-sectional view taken along line E-E, respectively, before the screw member 3 is inserted into the through hole 21 and the accommodation part 22. The through hole 21 is provided with an opening 211 extending from the through hole 21 to a periphery of the fixing member 2. An accommodation part 22 is provided inside the through hole 21, and the accommodation part 22 extends from the through hole 21 toward the inner wall 11 by a predetermined angle A corresponding to a direction of the opening 211. The predetermined angle A is an acute angle included by an insertion axis L of the accommodation part 22 and the inner wall 11. The accommodation part 22 is formed with a notch 23 corresponding to the direction of the opening 211. The accommodation part 22 is connected to the inner wall 11 through the notch 23. As shown in FIG. 5, the notch 23 and the accommodation part 22 of the fixing member 2 form a groove U having an inclined angle. FIG. 7A and FIG. 7B are a bottom view and a partially cross-sectional view taken along line F-F respectively, illustrating that the screw member 3 is inserted into the through hole 21 and the accommodation part 22. When the insertion end 32 of the screw member 3 is rotatably inserted from the through hole 21 into the accommodation part 21 along the insertion axis L, the accommodation part 22 forms the second engaging thread 221 which is complementary to the shape of the screw member 3, and the insertion end 32 abuts against the inner wall 11 to form the small recess 111 thereon. The small recess 111 forms the first engaging thread 112 which is complementary to the shape of the screw member 3. When the first primary tube 1 has a thinner wall, a small protrusion 14 is formed on an outer wall of the primary tube 1 at a position corresponding to the small recess 111. FIG. 8A and FIG. 8B are a bottom view and a partially cross-sectional view taken along line G-G, respectively, after the screw member 3 is pulled out from the through hole 21 and the accommodation part 22. FIG. 8A and FIG. 8B show the second engaging thread 221 of the accommodation part 22 and the first engaging thread 112 of the small recess 111. The second embodiment may greatly reduce the manufacturing and maintaining costs of mold at the production stage, and may use two or more of the accommodation parts 22 and screw members 3 on one fixing member 2.

Figure 9A:
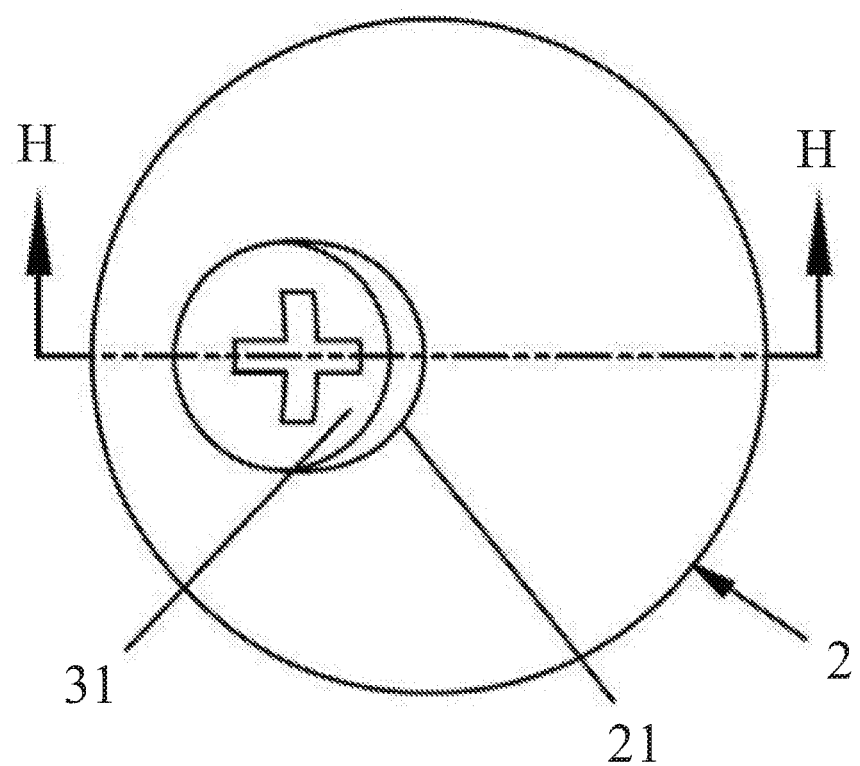
FIG. 9A is a bottom view of a third embodiment of the present invention after the screw member is inserted into the through hole and the accommodation part.
Figure 9B:
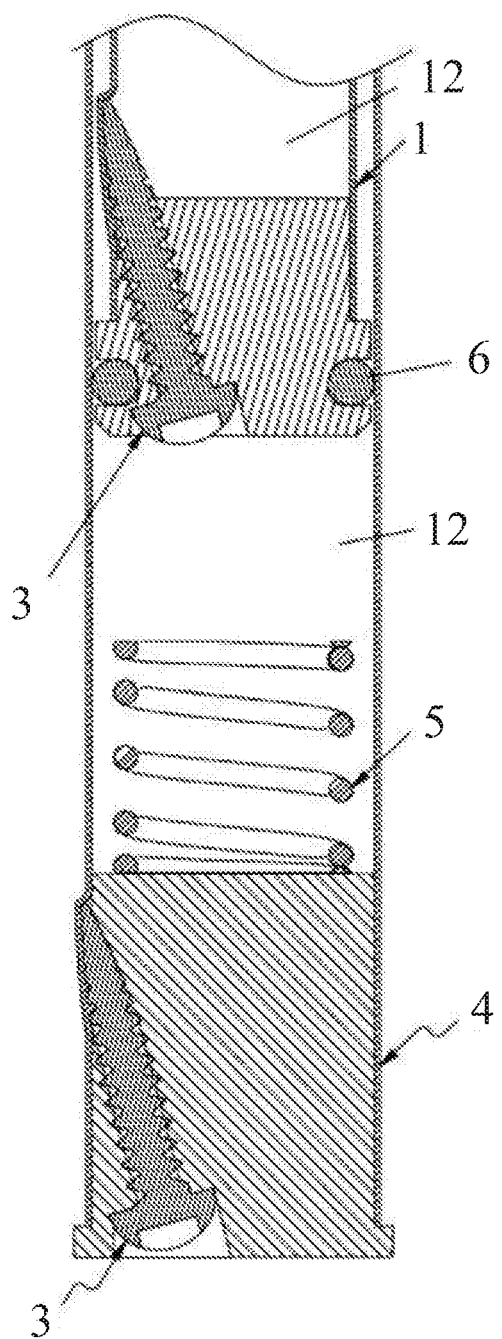
FIG. 9B is a partially cross-sectional view of the third embodiment of the present invention taken along line H-H after the screw member is inserted into the through hole and the accommodation part.

As shown in FIG. 9A and FIG. 9B, the present invention can be applied on telescopic tubes. In other words, an outer tube 4 is sleeved on an exterior of the primary tube 1, and the primary tube 1 may be slidable in the outer tube 4. The in-tube fixing assembly according to the present invention may be optionally provided with a buffer part, for example, a spring 5 is provided inside the outer tube 4 or the fixing member 2 of the primary tube 1 is provided with a sealing member 6, to form a spring-loaded mechanism or an air-cushioned mechanism. The present embodiment may be used on the telescopic tube of a tripod.

Preferably, as shown in FIGS. 4B and 8B, the accommodation part 22 according to the present invention may be pre-formed with a second engaging thread 221 corresponding to the screw member 3.

Figure 10A:
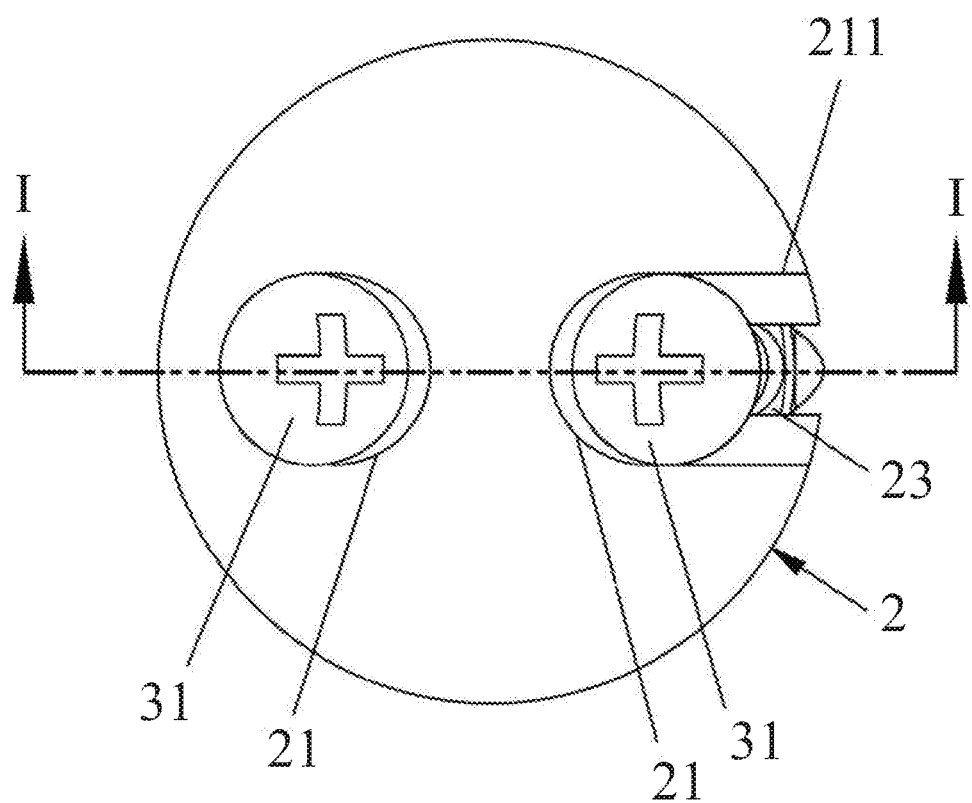
FIG. 10A is a bottom view of a fourth embodiment of the present invention after the screw member is inserted into the through hole and the accommodation part.
Figure 10B:
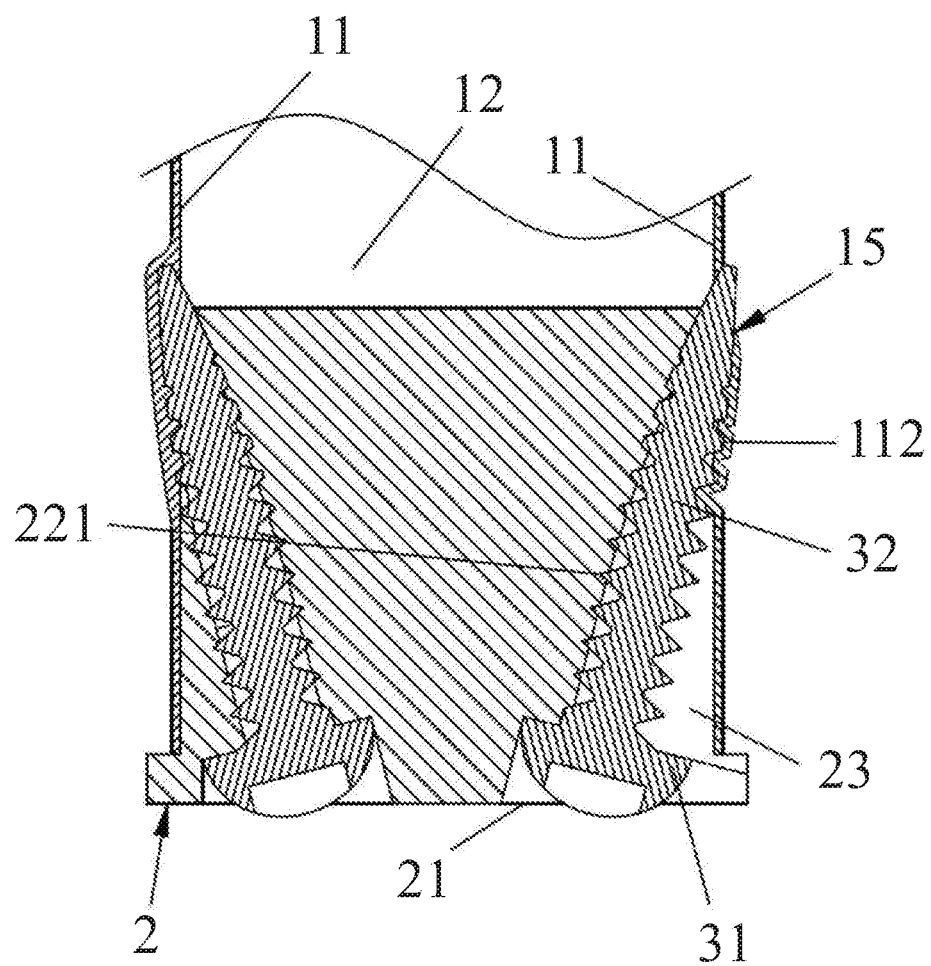
FIG. 10B is a partially cross-sectional view of the fourth embodiment of the present invention taken along line I-I after the screw member is inserted into the through hole and the accommodation part.

Preferably, as shown in FIG. 10A and FIG. 10B, the fixing member 2 according to the present invention is provided with two or more of accommodation parts 22 and screw members 3 to strengthen the fixing force of the in-tube fixing assembly.

Preferably, as shown in FIG. 10B, the small recess 111 according to the present invention is abutted by the insertion end 32 of the screw member 3 to form a perforation 15. That may strengthen the fixing force of the in-tube fixing assembly.

Although the present invention has been described with reference to the preferred embodiments, it is apparent to those skilled in the art that a variety of modifications and changes may be made without departing from the scope of the present invention which is intended to be defined by the appended claims.

What is claimed is:

1. An in-tube fixing assembly comprising:
a primary tube having an outer wall, an inner space and an inner wall defining the inner space;
a fixing member inserted partially or wholly into the inner space from an opened end of the primary tube and provided with at least one through hole at an appropriate position, the at least one through hole provided with an accommodation part extending in a direction from the at least one through hole toward the inner wall of the primary tube by a predetermined angle with respect to the inner wall; and
at least one screw member, one end of which is defined as an operation end and the other end defined as an insertion end, the at least one screw member having has' a diameter which gradually decreases from the operation end to the insertion end,
wherein the primary tube is deformed to form a recessed portion on the inner wall with a corresponding protruded portion on the outer wall after the at least one screw member is inserted through the accommodation part into the at least one through hole with the insertion end pressing and abutting the recessed portion on the inner wall and a portion of the screw member near the operation end kept inside the fixing member, and the recessed portion and the accommodation part respectively form a first engaging thread and a second engaging thread complementary to a screw thread of the at least one screw member.

2. The in-tube fixing assembly as claimed in claim 1, wherein the at least one through hole further extends sideways towards one side of the fixing member and forms an opening on the one side of the fixing member, and the accommodation part is formed with a notch facing the opening.

3. The in-tube fixing assembly as claimed in claim 1, wherein the primary tube has a perforation adjacent to the corresponding protruded portion on the outer wall and a portion of the insertion end of the at least one screw member is exposed through the perforation.

* * * * *